Oct. 15, 1968    R. L. HARTMAN ET AL    3,406,384
FIRE DETECTOR AND PREVENTER SYSTEM
Filed Aug. 26, 1966    2 Sheets-Sheet 1
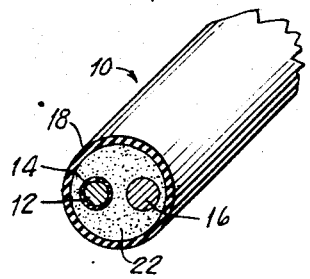
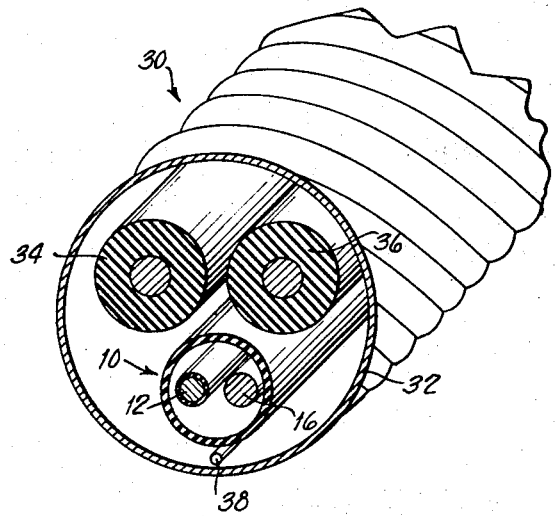
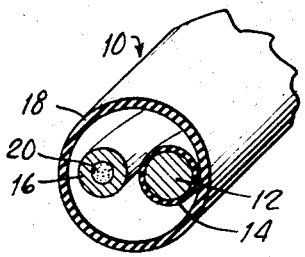
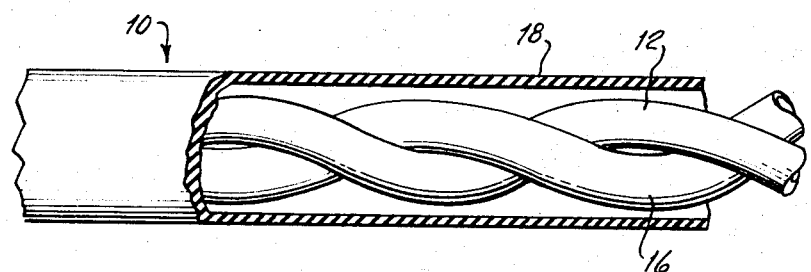
INVENTORS
RICHARD A. HARTMAN
ROBERT L. HARTMAN
BY
ATTORNEY

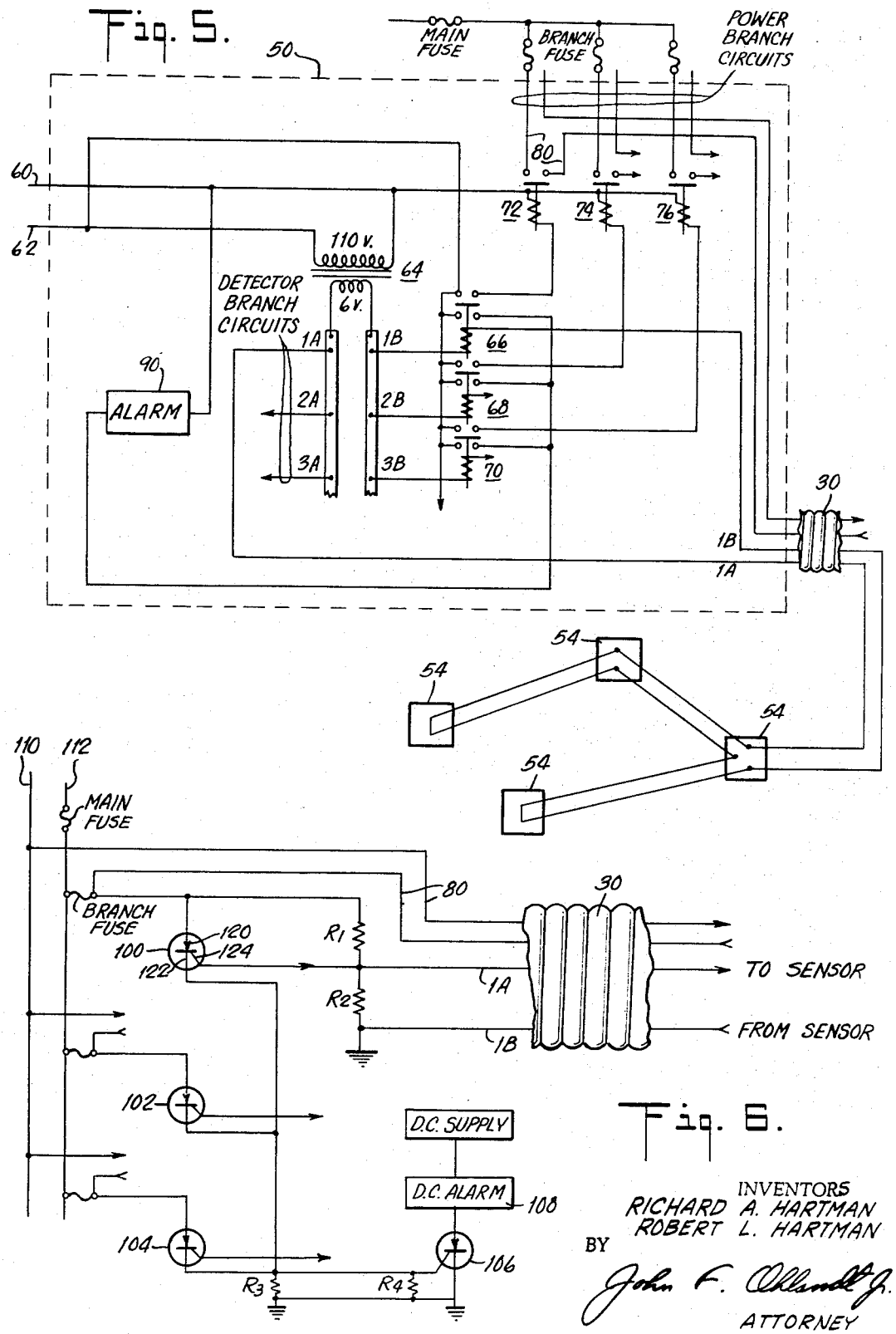

3,406,384
FIRE DETECTOR AND PREVENTER SYSTEM
Robert L. Hartman, Hollis, N.Y. (Apt. DD5, 1275 Rock
Ave., North Plainfield, N.J. 07060), and Richard A.
Hartman, 9130 193rd St., Hollis, N.Y. 11423
Filed Aug. 26, 1966, Ser. No. 575,311
7 Claims. (Cl. 340—227)

ABSTRACT OF THE DISCLOSURE

A sensor cable and a unitary cable structure for use in a fail-safe fire detector and preventer system according to which the sensor cable itself comprises a pair of spaced conductors, one of the conductors being a conventional insulated wire, the other being a soft, readily-meltable, uninsulated wire which is adapted to sever, responsive to a high temperature condition, out of contact with said conventional wire, and non-flammable insulation in the form of stiff tubing surrounding the pair of spaced conductors, the non-flammable insulation having the property that it does not melt before the melting of the soft wire. The system disclosed incorporates this sensor cable and further provides means responsive to the detection of a high temperature condition for interrupting the power supply to the associated power conductors, thereby to provide a safety feature in that the system operates to prevent the outbreak of a fire resulting from a deficiency in a power branch circuit associated with a detector circuit.

---

This invention relates to a fire detector system, and more particularly, to a system and to apparatus within the system for sensing, detecting and locating dangerous temperature rises and for giving an alarm indicative of such dangerous rises in temperature.

Although many devices and apparatus for detecting changes in ambient temperature have been proposed before, they have not proven to be commercially feasible. Generally they require a great amount of additional labor for their installation and thus are regarded as too costly for practical implementation.

Accordingly, it is a primary object of the present invention to provide a reliable, inexpensive and readily installed fire detector and preventer system.

Another object is to provide a fail-safe system that includes as a component thereof a sensor cable which senses significant changes in temperature and which is adapted to be incorporated as part of a unitary cable structure, thereby providing simplicity of system installation.

Another object is to provide apparatus and means within the system that will respond to dangerous conditions stemming from a plurality of causes.

Another object is to detect the incipient outbreak of fire arising from cable faults and overload protective device failure, and to prevent an actual outbreak.

Considering the sensor component of the complete detector and preventer system, the sensor is a two-wire cable, one of the wires being a conventional wire such as of copper, aluminum or the like. The other wire of the sensor pair is a wire consisting of a low melting point (approximately 250° F.) ductile alloy such as InSn or BiCdInSn, or PbSn (60/40). However, the exact alloy may be varied somewhat but is of such a nature that it will melt below the kindling point of wood and similar commercial construction materials.

Although, in general, detector schemes involving the use of a sensor having a meltable wire have been proposed before, such schemes have not been adapted for operation in a fail-safe detector system and for integration in a common cable structure. Their configuration has been such that they have been required to be processed in a special manner and to be installed in such a way as to be burdensome and uneconomical.

Accordingly, a primary feature of the present invention resides in the provision of a two-wire cable for incorporation in a fail-safe system for sensing high temperature rises. Such sensor cable is capable of being processed into a conventional cable such that a unitary cable structure is produced in which the sensor wires are in immediate proximity to the conventional wires that are installed into homes, commercial buildings and such. Moreover, the unitary cable structure as an article of manufacture is installable as such; that is to say, the cable including both the sensor wires and associated wires are installed together in a single operation.

Another primary feature of the present invention resides in the fact that the system has a preventer function, that is, the system acts, upon sensing a dangerous condition, to open at least the power branch circuit associated with a sensor branch circuit. Thus, a potential outbreak of fire due to a power wire fault or other cause will be prevented from becoming an actuality by interruption of power to the branch circuit in which the fault is located. Thus a unique safety feature is provided by the present invention.

From the aspect of the installation of a complete system, the present invention contemplates that each and every conventional power branch circuit will have associated with it a detector branch circuit formed in part by the sensor cable as described hereinabove. The arrangement is such that the meltable alloy wire and its copper return wire are connected in a series loop in association with each of the plurality of power branch circuits. Of course, if desired, the complete system need not have the sensor wires completely coincident with the associated power wires. Thus, at some point or points in the several composite branch circuits the sensor wires may be extended in a different configuration from the power wires. However, the sensor wires extend at least as far as the power wires, thus insuring complete protection.

In a typical installation of the complete system, after the unitary cable structure has been through the areas to be protected, such as a run through the entire house or a similar structure, the detector branch circuits are then wired up at a central control station, such as a panel board, with the associated means for indicating the outbreak of fire or the incipient outbreak due to a fault in the power wires or overload protective device. Also as part of the system, there is provided at the control panel apparatus to open automatically an affected power branch circuit, or to interrupt the entire power system, in order to prevent an outbreak such as alluded to previously.

Since the detector branch circuits are to operate with a low voltage supply, there is provided at the control station a step-down transformer connected to the power supply. Also provided is an alarm means, such as a bell or the like, which is energized by an alarm circuit and is activated in response to the detection of a high temperature condition. The detector branch circuits can utilize either an AC or DC system. In the latter case a rectifier or battery would be used.

It should be noted that the action of the complete system when installed is twofold. If a fire occurs anywhere near the sensor wires, the meltable one of the wires opens and causes the sounding of the alarm. The alarm, of course, could be arranged in conjunction with other means to call the fire department directly over existing telephone wires. Secondly, as noted above, if anything goes wrong with the associated power wires that have been extended throughout the critical areas due to any cause, such as ageing of, or damage to, the cable whereby the cable heats without blowing the fuse, the alarm rings and the faulty power branch circuit is automatically opened before a fire can start. By virtue of the unique design of the present system the location of the cable which is faulty can be immediately determined and this cable can then be replaced.

The foregoing and other objects, features and advantages of the invention will be apparent from the following more particular description of preferred embodiments of the invention as illustrated in the accompanying drawings.

FIG. 1 is a perspective view of a form of the sensor cable of the present invention.

FIG. 2 is a perspective view of a modified version of the sensor cable.

FIG. 3 is a longitudinal view, partly broken away, of the sensor cable shown in FIG. 2.

FIG. 4 is a cross-sectional view of a unitary cable structure of the present invention.

FIG. 5 is a schematic wiring diagram for the complete fire detector-preventer system.

FIG. 6 is a schematic diagram of a modified detector-preventer apparatus that may be incorporated into the system shown in FIG. 5.

Referring now to FIG. 1, there is shown the sensor cable 10 which comprises a pair of conductors, one of which is a conventional copper or aluminum return wire 12 provided with a thin insulation coating 14, such as of Formvar, or other suitable coating. The meltable wire 16 is shown disposed immediately adjacent to the return wire 12. In this basic embodiment of the sensor cable shown in FIG. 1 the wires 12 and 16 would be disposed roughly parallel to each other. However, it is preferred that the two sensor wires be twisted in a bifilar fashion. Such a preferred arrangement for the sensor wires is shown in FIGS. 2 and 3 wherein the same reference numerals as in FIG. 1 are employed.

Surrounding the two sensor wires is a high temperature insulation 18 which is constituted typically of a thermoplastic material such as Teflon, or vinyl coated fiberglass. This insulation is fairly stiff and serves as a tubing for the wires 12 and 16. The insulation 18 is advantageously selected to have the property of not melting before the melting of the soft wire 16.

It will be appreciated that although only two embodiments of the sensor cable have been depicted in FIGS. 1, 2 and 3, other configurations can be used. For example, the soft, meltable wire 16 can be centrally located and the conventional wire 12 can be simply spiralled about wire 16.

With respect to FIG. 2, it will be noted that another form of the low melting wire for the sensor pair has been provided therein. Thus, this meltable wire is provided with a core 20 which consists of a non-corrosive, non-flammable material that melts and boils at below the melting point of the alloy wire, such as a rosin or a silicon grease.

As one means of insuring that the meltable wire will completely melt away and open the circuit in which it is connected, there may be provided as shown in FIG. 1 a filler material 22 in the space between wires 12 and 16. This filler material can be a silicon grease, for example, or any insulating substance that is non-flammable and disintegrates or melts below the melting point of the meltable wire 16. In contrast to this use of filler material, the bifilar embodiment of FIGS. 2 and 3 dispenses with such use and the wires are simply separated by empty space. In addition, in this case, because of the twisted arrangement it is insured that the meltable wire will completely melt away and break the circuit.

Referring now to FIG. 4, there is shown the unitary cable structure 30, into which the sensor cable 10 is adapted to be incorporated. Such unitary cable structure may be constituted in the manner of forming a typical "BX" cable. Thus, within the metal cladding 32 there are disposed two of the standard cable wires 34 and 36 which are normally incorporated and utilized as power line conductors. Spaced therefrom is the sensor cable 10 with its wires 12 and 16. Also shown within the metal cladding 32 is an aluminum ground wire 38 which may conveniently be arranged within the unitary cable structure 30 but is not considered essential to the present invention.

It will be understood, of course, that the "BX" cable depicted in FIG. 4 is one form of the environment in which the sensor cable 10 can be practically disposed. Other arrangements are also possible and other forms such as Romex cable can be adapted to constitute the unitary cable structure.

Moreover, it should be noted that although the unitary cable structure depicted in FIG. 4 takes especial advantage of the ready association with power wires or conductors in "BX" cable or the like, it is possible, within the ambit of the present invention, to arrange for other dispositions of the detector cable, particularly in conjunction with other types of conductors such as signal and control conductors. As just one example, the sensor cable of the instant invention may be adapted to be enclosed by the heavy insulation which normally surrounds insulated or uninsulated copper wires for certain heavy duty applications. A replaceable form of the sensor cable might be found to be more useful in these applications. This can easily be accomplished by a double-jacketed Teflon-like outer insulation. In this instance the sensor cable with its own insulation is pulled out of the outer insulation in the event that a fault therein dictates replacement.

In FIG. 5, there is illustrated an embodiment of the complete system of the present invention. At a control station or panel 50, there is provided the detector and preventer apparatus that will respond to a dangerous high temperature condition in the area that is to be protected and to provide both an alarm indicative of such dangerous condition and to interrupt automatically the power supply to the area at which the dangerous condition exists. From the control station 50 the necessary circuits are extended through the previously described unitary cable structure. A typical detector branch circuit 1A, 1B is shown extended from one end of the fragmentary showing of cable structure 30 to a series loop 52 that is formed by suitable interconnections at a plurality of typical junction boxes 54. For the sake of simplicity of illustration, the associated power branch circuit is not shown extended, but it will be obvious to those skilled in the art how this is accomplished.

At the control station 50 a pair of power line conductors 60 and 62 are connected to a transformer 64 in order to step down the voltage from the conventional power line voltage of 110 volts AC to the required low voltage to be used in the detector system, that is, to approximately 6 volts AC. As noted before, if it is desired to operate the low voltage detector circuits by means of DC then a rectifier would be connected to the secondary of transformer 64. Batteries, of course, could also be used. To the secondary of transformer 64 a plurality of detector branch circuits, designated 1A, 1B; 2A, 2B; 3A, 3B are connected. Only one of the typical detector branch circuits, 1A, 1B, is shown completed by way of the cable structure 30 out to its series loop 52. Within the detector circuit 1A, 1B, there is included a relay 66 and of course, in the other typical detector circuits there are provided relays 68 and 70 for the same purposes. The action of the relay 66 in the detector circuit 1A, 1B, is such that when energized, that is, when detector circuit 1A, 1B is closed, the upper contacts of relay 66 will be closed, thus completing the circuit for a power relay 72 that is provided therein. With current thereby supplied to relay 72 by way of lines 60 and 62, through the upper contacts of relay 66, the contacts of relay 72 are in their normal or closed position, and hence, power is supplied to the associated power branch circuit 80 which is extended, concomitantly with detector branch circuit 1A, 1B, through cable structure 30 to supply the power needs within the area encompassed by series loop 52 of the detector branch circuit 1A, 1B.

It is to be noted that, rather than employing the separate power relay 72, the arrangement could be such that an extra set of contacts is provided on relay 76. Also it will be understood that, in place of the power relay 72 shown in FIG. 5, the required function could be provided by an existing thermal or magnetic power disconnect relay already installed in the house or similar structure.

In the same manner of operation as described for relay 72, the power relay 74 and 76 act to affect their associated power branch circuits responsive to the action of their respective control relays 68 and 70.

When a dangerous condition occurs, that is, when either there is an actual outbreak of fire, or the incipient outbreak due to a power wire fault within the unitary cable structure 30, or failure of an overload protective device, the typical detector circuit 1A, 1B will open due to the melting of the wire 16 within the sensor cable 10. Such an open circuit condition will cause relay 66 to be de-energized thereby causing opening of its upper contacts and closing of its lower contacts. The closing of the lower contacts of relay 66 will cause power to be supplied by way of the lines 60 and 62 to the alarm 90 which will indicate the existence of a dangerous condition.

The opening of the upper contacts of relay 66 will interrupt the power supply to power relay 72 which will become de-energized, thereby resulting in the opening of its contacts. Such action automatically interrupts the power supply to the power branch circuit 80. In like manner, the de-energization of power relays 74 and 76 will produce interruption of power to their respective power branch circuits responsive to the opening of their detector branch circuits.

It will be understood, of course, that, in place of separate control of each of the power branch circuits, the arrangement may be such that responsive to the dangerous condition power may be interrupted to all of the power branch circuits by the use, for example, of a single power relay for this purpose.

In either event, the operation of the detector and preventer apparatus at the control station 50 is such that it automatically responds to any dangerous condition, and in the case of the dangerous condition stemming from a fault within the cable structure, or failure of the overload protective device, the power supply to that cable will be interrupted, thereby preventing the outbreak of fire.

Referring now to FIG. 6, there is illustrated another embodiment of apparatus that may be incorporated into control station 50 in place of the relay arrangement previously described. This embodiment utilizes devices which are commonly known as silicon controlled rectifiers. Three of these devices, designated 100, 102, 104 are shown connected into typical detector branch circuits. The connection of the silicon controlled rectifiers is such as to provide that either a branch fuse or a main fuse will be "blown," thus providing a large safety factor.

Considering one circuit arrangement as typical, it will be seen in FIGURE 6 that, as previously described, the power branch circuit 80 is connected to the main lines or bus bars 110 and 112. The power branch circuit 80 is extended through the cable structure 30, as discussed before. In the typical detector branch circuit 1A, 1B, which is also extended through the cable structure 30, there is shown connected the silicon controlled rectifier 100 whose anode 120 is connected through the branch fuse to the line 112 and whose cathode 122 is connected to resistor $R_3$ and thence to ground. Resistors $R_1$ and $R_2$ are shown connected to the rectifier 100, with $R_2$ connected between ground and the gate 124 of rectifier 100, and $R_1$ connected between the gate 124 and the anode 120. In this arrangement the sensor cable is a "short" (or low impedance) across $R_2$ of the voltage divider. $R_1$ and $R_2$ are selected to be quite large. Typically they have resistances in the order of thousands of ohms depending upon the silicon controlled rectifier that is used. Hence the criterion that the sensor cable be a "short" when it is intact is quite easily satisfied. The voltage at the gate 124 and, hence, across the sensor cable in the typical branch circuit 1A, 1B, is therefore quite small (on the order of 1 volt) as long as the sensor cable remains intact. This value of voltage (and associated current) is not large enough to trigger the rectifier 100, and, therefore, there is no current flowing between its anode 120 and cathode 122. If, however, the sensor cable opens, for any reason, the gate voltage rises and responsive to this rise the rectifier 100 triggers, that is, goes from its extremely high impedance state to a very low impedance state with a concomitant rise in the current flowing from anode to cathode. Typically such devices can pass 100 amperes in surges.

In the circuit arrangement of FIG. 6, when the sensor cable opens, the current passed is more than adequate to open the fuse or overload protective device for the associated power branch circuit 80. Should the fuse, or overload protective device, for this branch circuit be faulty, enough current can pass to open the main fuse, or overload protective device, for all the branch circuits.

Upon detection of a dangerous high temperature condition with the described effect of a tremendous surge of current through the silicon controlled rectifier in the affected detector circuit, an alarm is given indicative of the dangerous condition. This is accomplished by means of the silicon controlled rectifier 106, which is employed as a latch relay to detect the surve of current through $R_3$, which thereby causes current to flow through the rectifier 106 and through the alarm 108. It should be noted that the alarm 108 will continue to sound as long as the DC supply voltage exists. It will be appreciated, of course, that there are many alternative ways to trigger the silicon controlled rectifier 106 with the current surge.

It will be appreciated that there has been described herein a unique fire detector and preventer system. Such system has as one of its basic features the provision of a sensor cable for sensing dangerous high temperature conditions, and a unitary cable structure in which that sensor cable is ideally integrated. This results in a simple installation of the cable structure for its multiple purposes. A further basic feature which is provided by the instant invention is the capability of preventing the potential outbreak of fire due to a power wire defect, or failure of the overload protective device, from becoming an actual outbreak.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A sensor cable for a fire detector and preventer system comprising a pair of spaced conductors for defining a normally closed circuit, one of said conductors being a conventional insulated wire, the other being a soft, readily-meltable, uninsulated wire which is adapted to sever, responsive to a high-temperature condition, out of electrical contact with said conventional wire, said soft wire constituting means for opening said circuit; means for insuring severance of said soft wire, said means comprising non-flammable insulation in the form of stiff tubing spaced from and surrounding said pair of conductors, said non-flammable insulation having the property of not melting before the melting of said soft wire.

2. A sensor cable as defined in claim 1, wherein said pair of wires is twisted together.

3. As an article of manufacture, a unitary cable structure for use in a fire detector and preventer system comprising:

(1) a sensor cable comprising a pair of spaced conductors for defining a normally closed circuit, one of said conductors being a conventional insulated wire, the other being a soft, readily-meltable, uninsulated wire which is adapted to sever, responsive to a high-temperature condition, out of electrical contact with said conventional wire, said soft wire constituting means for opening said circuit; means for insuring severance of said soft wire, said means comprising non-flammable insulation in the form of stiff tubing spaced from and surrounding said pair of conductors, said non-flammable insulation having the property of not melting before the melting of said soft wire;

(2) a plurality of associated conductors in immediate proximity to said sensor cable;

(3) a protective covering enclosing both the sensor cable and associated conductors.

4. A unitary cable structure as defined in claim 3, which is capable of being installed as an entity and wherein said protective covering is a flexible metal cladding.

5. A unitary cable structure as defined in claim 4, wherein said plurality of associated conductors comprise conventional electrical conductors.

6. A fire detector and preventer system comprising
(a) a unitary cable structure which includes
(1) a sensor cable comprising a pair of spaced conductors, one of said conductors being a conventional insulated wire, the other being a soft, readily-meltable uninsulated wire which is adapted to sever, responsive to a high-temperature condition, out of contact with said conventional wire, and non-flammable insulation in the form of stiff tubing surrounding the pair of spaced conductors, the non-flammable insulation having the property of not melting before the melting of said soft wire;
(2) a plurality of associated power conductors in immediate proximity to said sensor cable;
(3) a protective covering enclosing both the sensor cable and associated conductors;
(b) means for detecting a high-temperature condition sensed by said unitary cable structure, including means adapted to be connected in a detector branch circuit formed by said sensor cable, for interrupting the power supply to at least the power branch circuit associated with said detector branch circuit.

7. A fire detector and preventer system comprising
(a) a unitary cable structure which includes:
(1) a sensor cable comprising a pair of spaced conductors, one of said conductors being a conventional insulated wrie, the other being a soft, readily-meltable, uninsulated wire which is adapted to sever, responsive to a high temperature condition, out of contact with said conventional wire, and non-flammable insulation in the form of stiff tubing surrounding the pair of spaced conductors, the non-flammable insulation having the property of not melting before the melting of said soft wire;
(2) a plurality of associated power conductors in immediate proximity to said sensor cable;
(3) a protective covering enclosing both the sensor cable and associated conductors;
(b) means for detecting a high temperature condition sensed by said unitary cable structure, including means adapted to be connected in a detector branch circuit formed by said sensor cable, for interrupting the power supply to at least the power branch circuit associated with said detector branch circuit, said power branch circuit being formed by the associated conductors in said unitary cable structure.

References Cited

UNITED STATES PATENTS

| | | | |
|---|---|---|---|
| 2,736,012 | 2/1956 | Bland et al. | 340—227.1 |
| 673,902 | 5/1901 | Gould | 200—143 |
| 2,483,793 | 10/1949 | Thomas | 200—143 |
| 2,774,850 | 12/1956 | Zaccardi | 200—143 |
| 1,779,610 | 10/1930 | Lyndon | 200—143 |

BERNARD A. GILHEANY, *Primary Examiner.*

H. B. GILSON, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,406,384                      October 15, 1968

Robert L. Hartman et al.

It is certified that error appears in the above identified patent and that said Letters Patent are hereby corrected as shown below:

Column 2, line 42, after "been" insert -- run --. Column 5, line 12, "occrus" should read -- occurs --. Column 8, line 9, "wrie" should read -- wire --; line 35, "673,902" should read -- 673,903 --.

Signed and sealed this 16th day of December 1969.

(SEAL)
Attest:

Edward M. Fletcher, Jr.                WILLIAM E. SCHUYLER, JR.
Attesting Officer                        Commissioner of Patents